(12) United States Patent
Cho

(10) Patent No.: US 9,751,530 B2
(45) Date of Patent: Sep. 5, 2017

(54) VEHICLE AND METHOD FOR CONTROLLING THEREOF

(71) Applicant: HYUNDAI MOTOR COMPANY, Seoul (KR)

(72) Inventor: Woon Ki Cho, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 14 days.

(21) Appl. No.: 14/958,510

(22) Filed: Dec. 3, 2015

(65) Prior Publication Data

US 2017/0057503 A1 Mar. 2, 2017

(30) Foreign Application Priority Data

Aug. 27, 2015 (KR) .................. 10-2015-0120662

(51) Int. Cl.
*B60W 30/12* (2006.01)

(52) U.S. Cl.
CPC .......... *B60W 30/12* (2013.01); *B60W 2420/42* (2013.01); *B60W 2540/26* (2013.01); *B60W 2710/202* (2013.01)

(58) Field of Classification Search
CPC ............. B60W 30/12; B60W 2420/42; B60W 2710/202; B60W 2540/26
See application file for complete search history.

(56) References Cited

U.S. PATENT DOCUMENTS

2013/0141250 A1* 6/2013 Mathieu ................. B60K 35/00
340/901
2013/0231830 A1* 9/2013 Van Dan Elzen .... B60W 50/14
701/42

FOREIGN PATENT DOCUMENTS

| JP | 07-23370 A | 1/1995 |
|----|------------|--------|
| JP | 2003-338000 A | 11/2003 |
| JP | 2007-015575 A | 1/2007 |
| JP | 2007-030849 A | 2/2007 |
| JP | 2015-069341 A | 4/2015 |
| KR | 10-0765891 B1 | 10/2007 |
| KR | 10-2012-0089498 A | 8/2012 |
| KR | 10-1340779 B1 | 12/2013 |
| KR | 10-2014-0016510 A | 2/2014 |

OTHER PUBLICATIONS

Korean Office Action issued in Korean Application No. 10-2015-0120662 dated Jul. 7, 2016.

* cited by examiner

*Primary Examiner* — Richard Camby
(74) *Attorney, Agent, or Firm* — McDermott Will & Emery LLP

(57) ABSTRACT

A vehicle includes an input unit configured to receive an input of a control point and a control degree related to lane keeping; a lane controller configured to determine whether to perform a lane keeping control based on the input control point, road conditions and a vehicle condition in the road; and a controller configured to control the vehicle's driving based on the control degree when the lane controller determines to perform the lane keeping control.

20 Claims, 12 Drawing Sheets

VEHICLE AND METHOD FOR CONTROLLING THEREOF

CROSS-REFERENCE TO RELATED APPLICATION(S)

This application claims the benefit of priority to Korean Patent Application No. 10-2015-0120662, filed on Aug. 27, 2015 in the Korean Intellectual Property Office, the entirety of which is incorporated herein by reference.

TECHNICAL FIELD

Embodiments of the present disclosure relate to a vehicle provided with a Lane Keeping Assist System, and a control method thereof.

BACKGROUND

Recently, Lane Keeping Assist Systems (LKAS) have been applied to vehicles. The LKAS is a system designed to assist with the operation of a steering wheel when the vehicle begins to move out of its lane, when this is not intended by the driver, occurring, for example, due to drowsiness. That is, LKAS is a system configured to assist a driver in following a target lane at a corresponding speed by detecting when the vehicle begins to move out of its lane. In addition, research into improving the convenience for the driver of a vehicle in which LKAS is applied is also in progress.

SUMMARY

Therefore, it is an aspect of the present disclosure to provide a vehicle including an input unit configured to receive an input of a control point and a control degree related to lane keeping; a lane controller configured to determine whether to perform a lane keeping control based on the input control point, road conditions and a vehicle condition in the road; and a controller configured to control the vehicle's driving based on the control degree when the lane controller determines to perform the lane keeping control.

Additional aspects of the present disclosure will be set forth in part in the description which follows and, in part, will be obvious from the description, or may be learned by practice of the present disclosure.

In accordance with one aspect of the present disclosure, a vehicle includes an input unit configured to receive an input of a control point and a control degree related to lane keeping; a lane controller configured to determine whether to perform a lane keeping control based on the input control point, road conditions and a vehicle condition in the road; and a controller configured to control the vehicle's driving based on the control degree when the lane controller determines to perform the lane keeping control.

The input unit may receive an input of a control point of a left lane, a control degree of a left lane, a control point of a right lane and a control degree of a right lane, individually.

The input unit may receive an input of a lane keeping level, which is set by mapping the control point and the control degree related to the lane keeping.

The controller may display a user interface, which is configured to receive an input of at least one of the control point, the control degree, and the lane keeping level of the vehicle, by controlling a display unit.

The controller may display a user interface, which is configured to input of at least one of the control point, the control degree, and the lane keeping level of the vehicle within a pre-set range, by controlling a display unit.

The vehicle may further include a recording unit configured to acquire image information related to front area of the vehicle.

The lane controller may derive information needed to recognize road conditions and information used to recognize vehicle conditions from image information acquired by the recording unit by image processing.

The lane controller may determine whether to perform the lane keeping control based on the information used to recognize road conditions, the information used to recognize vehicle conditions, and the input control point.

The lane controller may determine a steering torque value applied to a steering wheel, based on the input control degree.

The lane controller may apply a torque to the steering wheel by controlling operation of a steering system based on the determined steering torque value.

The lane controller may independently determine whether to perform the lane keeping control for the left lane and the right lane based on the input control point of the left lane and the right lane, and may independently determine a steering torque for the left lane and the right lane based on the input control degree of the left lane and the right lane.

In accordance with another aspect of the present disclosure, a control method of a vehicle includes receiving an input of a control point and a control degree related to lane keeping; determining whether to perform a lane keeping control based on the input control point, road conditions and vehicle condition in the road; and controlling the vehicle's driving based on the input control degree when the lane keeping control is determined to be performed.

The receiving an input may receive an input of a control point of a left lane, a control degree of a left lane, a control point of a right lane and a control degree of a right lane, individually.

The receiving an input may receive a lane keeping level set by mapping the control point and the control degree of the lane keeping.

The receiving an input may include acquiring image information related to front area of the vehicle.

The determining may further include deriving information needed to recognize road conditions and information needed to recognize vehicle conditions from the acquired image information by image processing.

The determining may further include determining whether to perform the lane keeping control based on the information used to recognize road conditions, the information used to recognize vehicle conditions, and the input control point.

The determining may determine a steering torque value applied to a steering wheel, based on the input control degree.

The controlling may apply a torque to the steering wheel by controlling operation of a steering system based on the determined steering torque value.

The determining may further include determining whether to perform the lane keeping control for the left lane and the right lane based on the input control point of the left lane and the right lane, independently and determining a steering torque for the left lane and the right lane based on the input control degree of the left lane and the right lane, independently.

BRIEF DESCRIPTION OF THE DRAWINGS

These and/or other aspects of the disclosure will become apparent and more readily appreciated from the following description of embodiments, taken in conjunction with the accompanying drawings, in which.

DETAILED DESCRIPTION

Reference will now be made in detail to embodiments of the present disclosure, examples of which are illustrated in the accompanying drawings.

Figure 1:
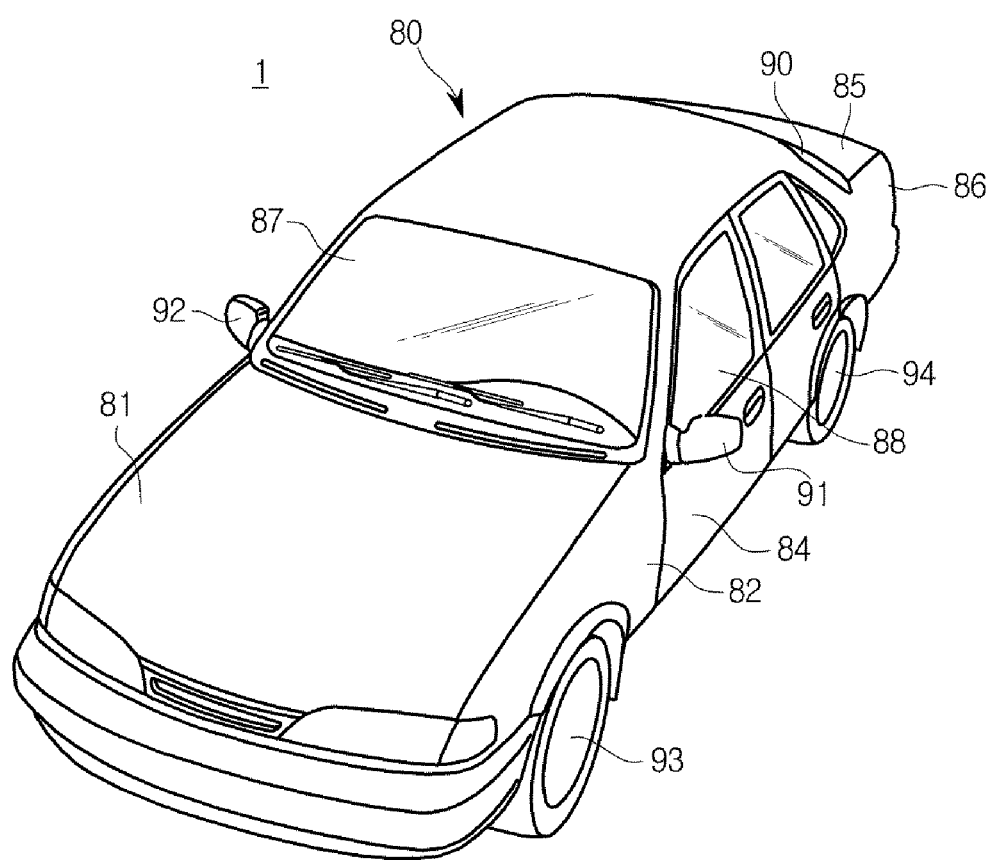
FIG. 1 is a view schematically illustrating an exterior of a vehicle in accordance with an embodiment of the present disclosure.
Figure 2:
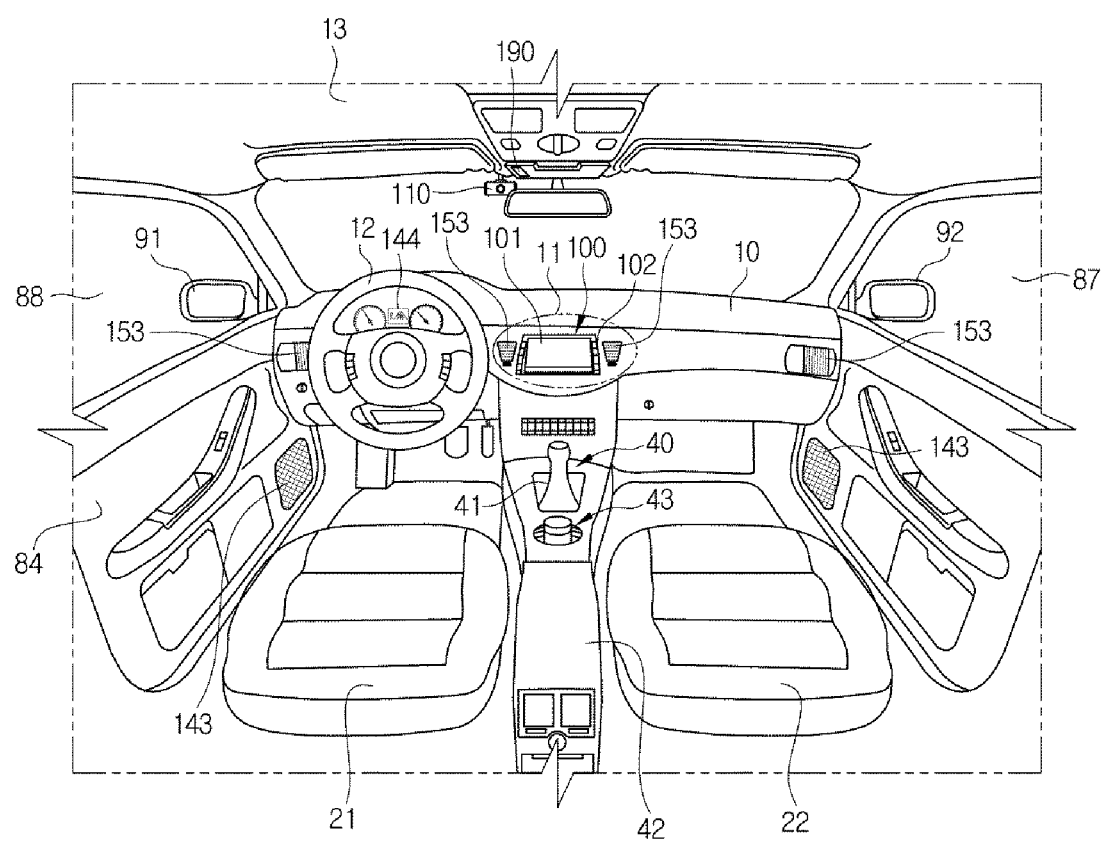
FIG. 2 is a view schematically illustrating an interior of a vehicle in accordance with an embodiment of the present disclosure.
Figure 3:
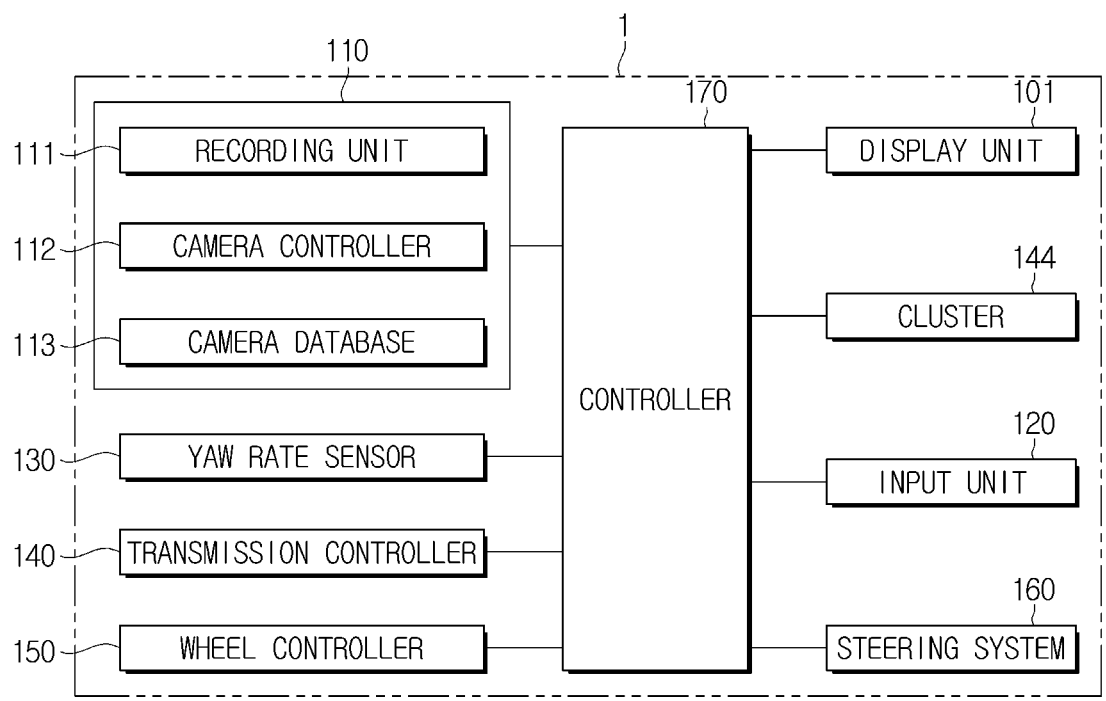
FIG. 3 is a first view illustrating a control block diagrams of a vehicle performing a lane keeping control operation in accordance with each embodiment of the present disclosure.
Figure 4:
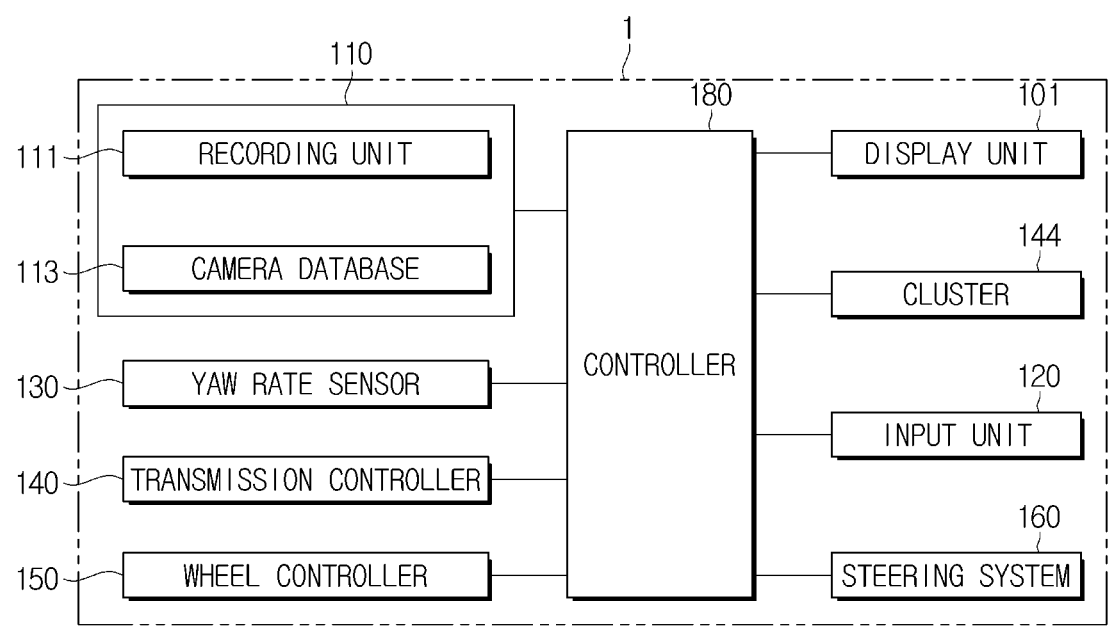
FIG. 4 is a second view illustrating a control block diagram of a vehicle performing a lane keeping control operation in accordance with each embodiment of the present disclosure.
Figure 5:
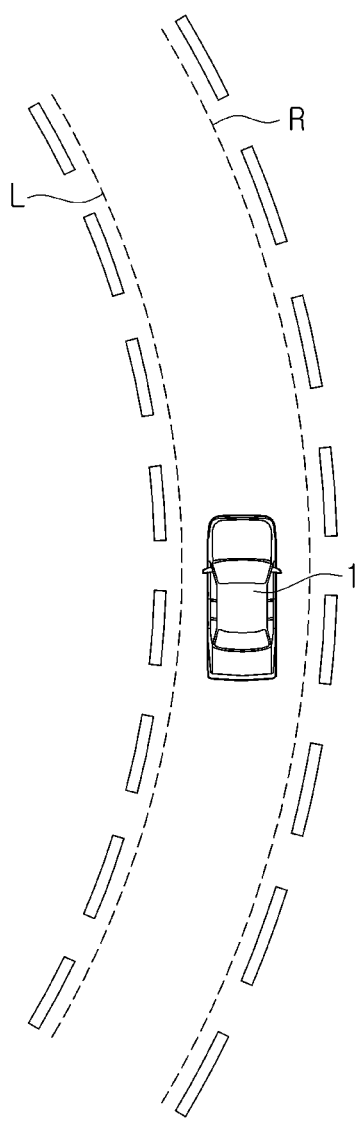
FIG. 5 is a view illustrating a lane keeping control operation of a vehicle in driving in accordance with an embodiment of the present disclosure.

FIG. 1 is a view schematically illustrating an exterior of a vehicle in accordance with an embodiment of the present disclosure. FIG. 2 is a view schematically illustrating an interior of a vehicle in accordance with an embodiment of the present disclosure. FIGS. 3 and 4 are control block diagrams of a vehicle performing a lane keeping control operation in accordance with each embodiment of the present disclosure. In addition, FIG. 5 is a view illustrating a lane keeping control operation of a vehicle in driving in accordance with an embodiment of the present disclosure and FIGS. 6 to 9 are views of a screen displaying a user interface configured to receive an input of at least one of a control point, a control degree, and a lane keep level of a vehicle via a display unit in accordance with an embodiment of the present disclosure. Hereinafter, in order to prevent an explanation from being repeated, an explanation thereof will be described with all together.

Referring to FIG. 1, a vehicle 1 may include a body 80 forming an exterior of the vehicle 1, and vehicle wheels 93 and 94 used for driving the vehicle 1. The body 80 may include a hood 81, a front fender 82, a door 84, a trunk lid 85, and a quarter panel 86.

In an external side of the body 80, a windshield 87 providing a view of a front of the vehicle 1, a side window 88 providing a view of a lateral side, side mirrors 91 and 92 installed on the door 84 to provide views of a rear side and a lateral side, and a rear window 90 installed in the rear side of the body 80 to provide a view of the rear side of the vehicle 1 may be provided. Hereinafter an internal configuration of the vehicle 1 will be described in detail.

An air conditioning device may be provided in the vehicle 1. An air conditioning device, which is to be described in the following, may represent a device configured to control air conditioning environment including inside/outside environmental conditions of the vehicle 1, air intake/exhaust, circulation, and cooling/heating condition, either automatically or by corresponding to a control command from a user. For example, an air conditioning device is provided in the vehicle 1 so that both heating and cooling may be performed, and heated or cooled air may be discharged via a vent 153 so that a temperature of the inside of the vehicle 1 may be controlled.

An Audio Video Navigation (AVN) terminal 100 may be provided in the vehicle 100. The AVN terminal 100 may represent a terminal configured to provide integrally an audio function, a video function as well as a navigation function to provide to a user a route to a destination. Herein, the AVN terminal 100 may be referred to as "a navigation terminal".

The AVN terminal 100 may selectively display at least one of an audio screen, a video screen and a navigation screen, and additionally display a variety of control screens related to the control of the vehicle 1 or a screen related to additional functions performed by the AVN terminal 100.

According to an embodiment, the AVN terminal 100 may display the variety of control screens related to the control of the air conditioning device through a display unit 101 by being interlocked with the above-mentioned air conditioning device. In addition, the AVN terminal 100 may adjust the air conditioning in the vehicle by controlling the operation state of the air conditioning device. The AVN terminal 100 may display a map in which a route to a destination is indicated for a driver, but is not limited thereto. The AVN terminal 100 may display an interface configured to input a variety of control commands related to lane keeping through the display unit 101. A detailed description thereof will be described later.

The display unit 101 may be disposed in the center fascia 11, which is the center area of the dashboard 10. According to an embodiment, the display unit 101 may be implemented by Liquid Crystal Display (LCD), Light Emitting Diode (LED), Plasma Display Panel (PDP), Organic Light Emitting Diode (OLED), and Cathode Ray Tube (CRT), but is not limited thereto.

In the vehicle 1, a cluster 144 may be provided. The cluster 144 may be referred to as "gauge board". Hereinafter, for convenience of description, it may be referred to as "cluster" 144. In the cluster 144, a driving speed, Revolution Per Minute (RPM), and an amount of fuel may be displayed. In addition, the cluster 144 may display a driving route by being interlocked with the AVN terminal 100, and may display road condition information, for example speed limit information. The cluster 144 may display a user interface configured to input a variety of control commands related to lane keeping of the vehicle 1. A detailed description thereof will be described later.

A head-up display device may be installed in the vehicle 1. This includes a windshield type display device configured to display a variety of information by projecting a light onto a reflector and allowing the light reflected from the reflector to be lighted on the windshield 87, and a combiner type configured to display a variety of information by providing an additional screen. According to embodiments of the present disclosure, the head-up display device of the vehicle 1 may employ these head-up display devices. Accordingly, the vehicle 1 may display the variety of information via the head-up display device. Hereinafter, for convenience of description, a device configured to display a variety of information, e.g. the above-mentioned display device 101, cluster 144, and head-up display device may be collectively referred to as "display device".

A speaker 143 configured to output sound may be provided in the vehicle 1. Therefore, the vehicle 1 may output sound, which is needed to perform an audio function, a video function, a navigation function and an additional function, via the speaker 143. For example, the vehicle 1 may provide a route to a destination to a driver via the speaker 143, but is not limited thereto.

A navigation input unit 102 may be disposed in the center fascia 11, which is the center area of the dash board 10. The driver may input a variety of control commands and a destination by operating the navigation input unit 102.

At this time, the navigation input unit 102 may be provided adjacent to the display unit 101 in a hard key type. Alternatively, when the display unit 101 is implemented by a touch screen type, the display unit 101 may perform a function of the navigation input unit 102.

In the center console 40, a center input unit 43 may be provided in a jog shuttle type or a hard key type. The center console 40 may represent a portion disposed between a driver seat 21 and a passenger seat 22 and in which a gear lever 41 and a tray 42 are formed. The center input unit 43 may perform a whole or a part of function of the navigation input unit 102.

A voice input unit 190 may be provided in the vehicle 1. The voice input unit 190 may receive an input of a voice command from a user. For example, the voice input unit 190 may be implemented by a microphone. The voice input unit 190 may convert a voice command, which is uttered by a driver via a microphone, into an electrical signal.

According to an embodiment, as illustrated in FIG. 2, the voice input unit 190 may be mounted to a headlining 13, but is not limited thereto. Therefore, the voice input unit 190 may be mounted to the dashboard 10 or the steering wheel 12. In addition, the voice input unit 190 may be mounted to any position as long as it is capable of receiving an input of a driver's voice in driving.

Hereinafter, a control block diagram of the vehicle 1 supporting a Lane Keeping Assist System will be described.

Referring to FIG. 3, the vehicle 1 may include a camera module 110, an input unit 120, a yaw rate sensor 130, a transmission controller 140, a wheel controller 150, a steering system 160, and a controller 170 other than the above mentioned components.

The components in the vehicle 1 may transmit and receive a variety of information via a network in the vehicle 1. According to an embodiment, the network of the vehicle 1 may represent a Controller Area Network (CAN). The CAN may be an automobile network to provide a digital serial communication between a variety of control devices in the vehicle 1, and may represent a network configured to provide real-time communication by replacing complicated electrical wiring and relay of electronic components with serial communication lines. However, the network is not limited thereto, and the above-mentioned components may transmit and receive a variety of data via any network available in the vehicle 1.

The input unit 120 may be implemented by the above-mentioned navigation input unit 102, the voice input unit 190, and the center input unit 43. When the display unit 101 is implemented by a touch screen type, the display unit 101 may perform a function of the input unit 120.

The input unit 120 may receive an input of a variety of control commands from a driver or a passenger (hereinafter a driver and a passenger are referred to as "a user"). For example, the input unit 120 may receive an input of an operation command of a variety of modules embedded in the AVN terminal 100 as well as a variety of control commands of devices in the vehicle 1.

The input unit 120 may receive an input of a variety of setting commands related to a lane keeping control operation from a user. According to an embodiment, the input unit 120 may receive an input of a control point related to the lane keeping of the vehicle 1. Herein, the control point related to the lane keeping may represent a time point of performing a lane keeping control operation.

According to an embodiment, the control point may include a control point related to a left lane, and a control time related to a right lane. The input unit 120 may receive an input of a control point related to the left side and the right side from a user, individually. For example, the user may drive closer to the left lane or the right lane based on the driving habit or driving style. Therefore, according to an embodiment, the vehicle 1 may receive an input of a left side control point and a right side control point from a user, individually, and then may independently perform a lane keeping control operation related to the left side and the right side based on the control point. A detailed description thereof will be described later.

The camera controller 112 may set a left line boundary and a right line boundary of a lane in which the vehicle is driving, based on the input control point related to the left lane and the control point related to the right lane. Therefore, when the vehicle 1 moves out of at least one of the left line boundary and the right line boundary, the lane keeping control operation may be performed in the vehicle 1 from a point of time of moving out of the lane and then may control the driving of the vehicle 1 to prevent the vehicle 1 from moving out of the lane.

For example, when receiving an input of a control point of the left lane and a control point of the right lane, corresponding to a point of time of intervening in the driving of the vehicle 1, via the input unit 120, the camera controller 112 may set a left line boundary (L) and a right line boundary (R) on a lane, as illustrated in FIG. 5. A detailed description thereof will be described later.

If a lane keeping control operation is performed at any time, it may interrupt a driver's driving. In addition, the current Lane Keeping Assist System may have the disadvantage that a driver is not able to set control points on the left side and the right side, individually. Therefore, the operation of the Lane Keeping Assist System may interrupt the driver's driving due to the driver's driving habits.

According to embodiments, the vehicle 1 may receive an input of a control point from a user and then set a lane keeping control operation based on the control point. Therefore, according to embodiments, the vehicle 1 may allow a driver to set a point in time for intervening with the driving, so that the safety of the driver may be secured and, at the same time, the interruption in the driving may be minimized.

The input unit 120 may receive an input of a control degree from a user. Herein, the control degree may represent an intensity of intervening with the driver's driving through the lane keeping control operation. For example, the control degree may correspond to a steering torque value applied to a steering wheel to keep in a lane by the Lane Keeping Assist System.

The driving style may vary depending on the driver. When a vehicle moves out of a lane with a certain degree, a certain user may want the vehicle to return to the center area of the lane through a strong intervention quickly, but another user may want the vehicle to return to the center area of the lane through a weaker intervention slowly. According to an embodiment, the vehicle 1 may perform a lane keeping control operation based on the user's style by receiving an input of a control degree from a user directly via the input unit 120 so that the degree of freedom of the driver may be improved.

Figure 6:
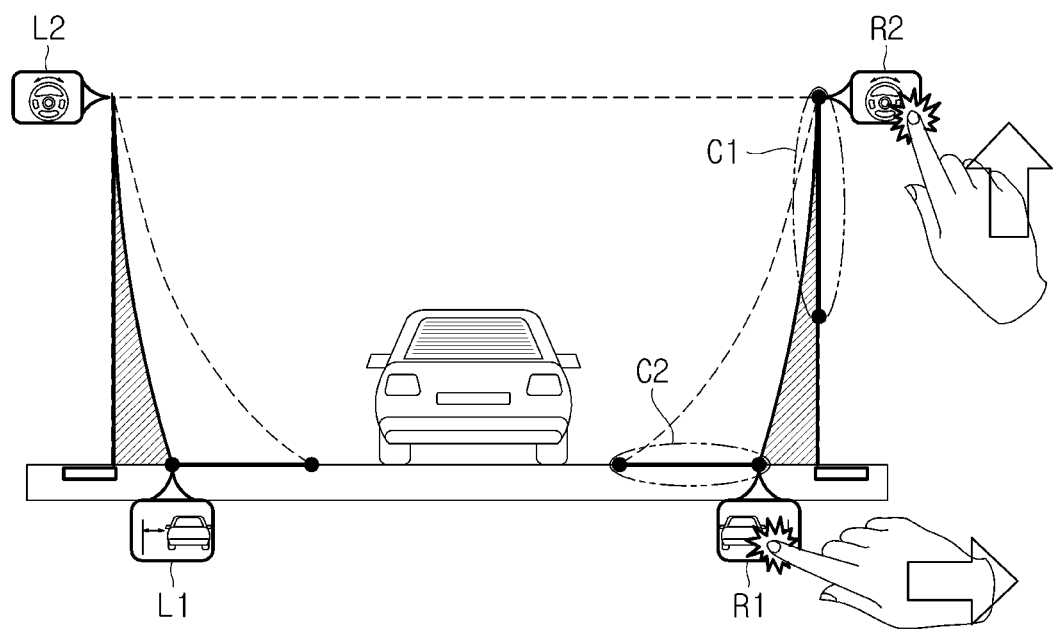
FIG. 6 is a first view illustrating a screen displaying a user interface configured to receive an input of at least one of a control point, a control degree, and a lane keep level of a vehicle via a display unit in accordance with an embodiment of the present disclosure.

Referring to FIG. 6, in the display unit 101, a user interface, which is configured to receive an input of a control point and a control degree related to the lane keeping control operation, may be displayed. On the display unit 101, an icon (L1) configured to set a control point of the left lane and an icon (R1) configured to set a control point of the right lane may be displayed. In addition, on the display unit 101, an icon (L2) configured to set a control degree of the left lane and an icon (R2) configured to set a control degree of the right lane may be displayed.

The above mentioned operation configured to display the user interface via the display unit 101 may also be performed via the controller 170. A detailed description of the controller 170 will be described later.

According to an embodiment, a user may set a control point and a control degree individually by touching or dragging the icon displayed on the display unit 101. At this time, the user may set a control point related to the left lane and the right lane, individually, and also may set a control degree relate to the left lane and the right lane, individually.

According to an embodiment, as illustrated in FIG. 6, a user may set a control point of the left lane and the right lane to be wide, and may set a control degree to be high. In other words, the user may set the control point to be slow, and may set a steering wheel torque value applied to the steering wheel, which corresponds to an intervention intensity, to be strong.

Figure 7:
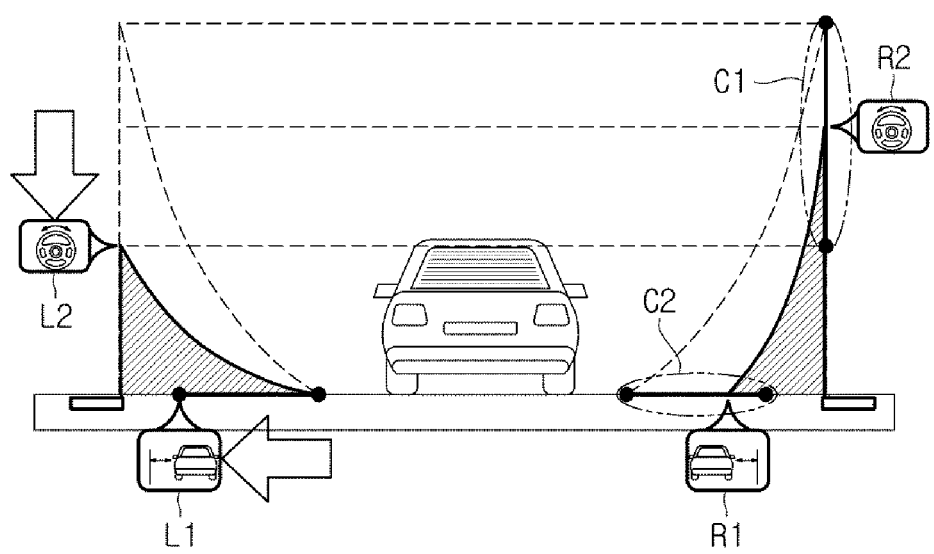
FIG. 7 is a second view illustrating a screen displaying a user interface configured to receive an input of at least one of a control point, a control degree, and a lane keep level of a vehicle via a display unit in accordance with an embodiment of the present disclosure.

According to another embodiment, as illustrated in FIG. 7, a user may set a control point of the left lane and the right lane to be narrow, and may set a control degree to be low. In other words, the user may set the control point to be fast, and may set a steering wheel torque value applied to the steering wheel, which is an intervention intensity, to be weak.

Figure 8:
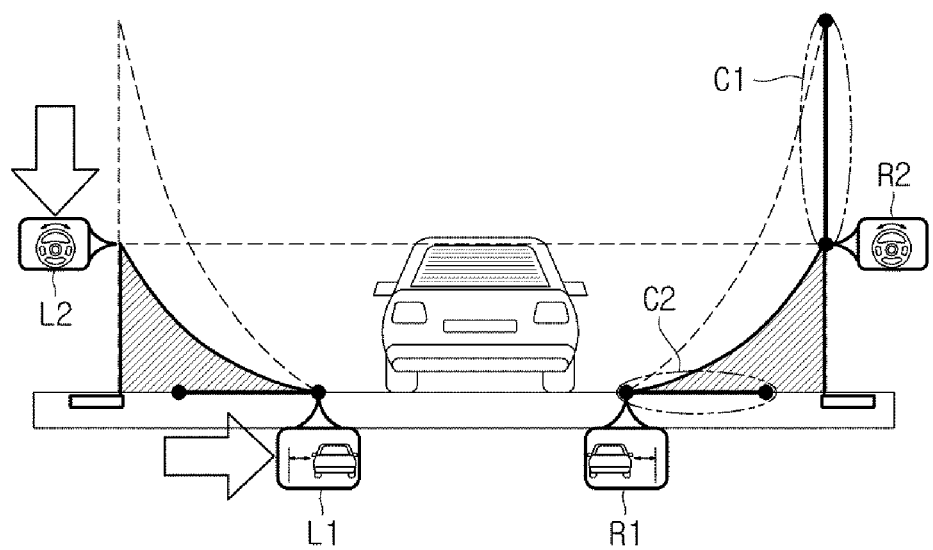
FIG. 8 is a third view illustrating a screen displaying a user interface configured to receive an input of at least one of a control point, a control degree, and a lane keep level of a vehicle via a display unit in accordance with an embodiment of the present disclosure.

According to another embodiment, as illustrated in FIG. 8, a user may set only a control point of the right lane so that a lane keeping control operation of the left lane is not operated. In other words, the user may turn off the lane keeping assist system of the left lane. That is, a user may set temporarily a control point and a control degree based on the driver's driving style, and the driver's habit, but is not limited thereto.

The input unit 120 may receive an input of a control point and a control degree within a pre-set control range. For example, the input unit 120 may allow a user to input a control point and a control degree only within a range allowing for safe driving. Herein, the control range may be pre-set by a designer when the vehicle 1 is designed. For example, the control range may be pre-set within a range allowing safe driving, based on a width of the vehicle 1.

An interface in which the control range is set may be displayed on the display unit 101. Herein, the control range may be set with respect to the control degree and the control point, individually. Referring to FIG. 6, a control range (C1) of the control degree and a control range (C2) of the control point may be displayed on the display unit 101, individually.

Since the control range is displayed on the display unit 101, it may be configured to allow a user to input the control degree and the control point only within the control range. That is, referring to FIG. 6, only within the control range (C2) of the control point, the user may move the icon (R1), which is configured to set the control point of the right side, by touching or dragging. On the drawings, the control range of the right side is illustrated, but is not limited thereto. Therefore, the control range of the left side may also be implemented.

The input unit 101 may receive an input of a lane keeping level in which a control point and a control degree are mapped. A user may experience discomfort inputting a control point and a control degree, individually. According to embodiments, the vehicle 1 may pre-set a control point and a control degree for each lane keeping proportionality.

Figure 9:
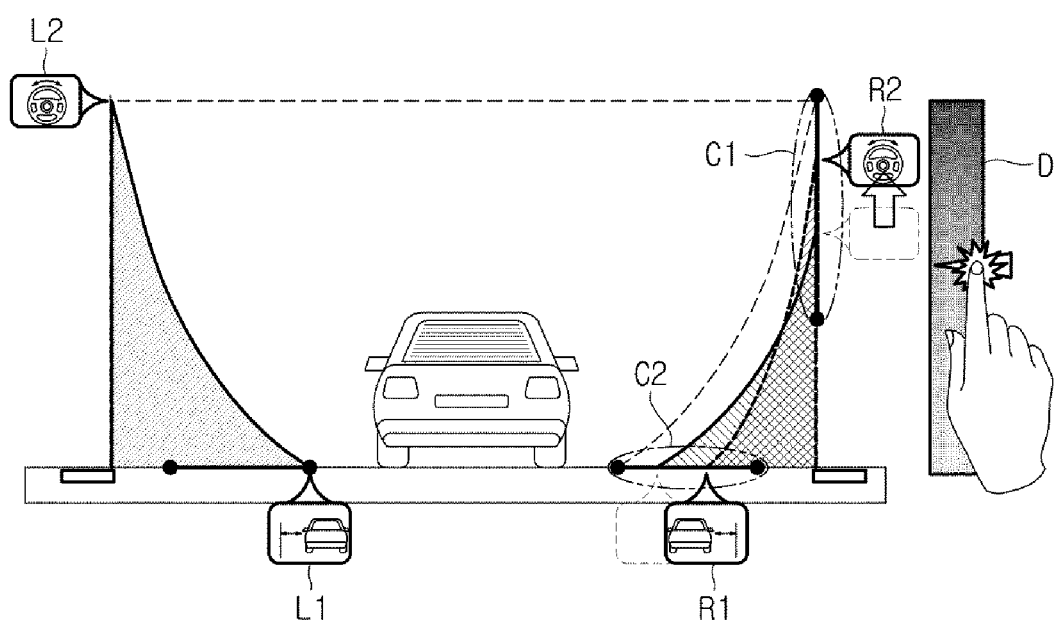
FIG. 9 is a fourth view illustrating a screen displaying a user interface configured to receive an input of at least one of a control point, a control degree, and a lane keep level of a vehicle via a display unit in accordance with an embodiment of the present disclosure.

For example, a control point and a control degree may be pre-mapped for each lane proportionally. Therefore, when a user sets the lane proportionally, the control point and the control degree may be set at the same time. According to an embodiment, a user interface configured to input a lane keeping level (D) may be displayed on the display unit 101, as illustrated in FIG. 9. Accordingly, the user may set the lane proportionally (D) by touching or dragging.

As illustrated in FIG. 3, the yaw rate sensor 130 may be provided in the vehicle 1. The yaw rate sensor 130 may represent a sensor configured to detect the yaw rate of the vehicle 1. Herein, yaw rate may represent a vehicle's angular velocity around its vertical axis penetrating the center of the vehicle 1.

For example, when the vehicle 1 is rotated with respect to a vertical axis, a flake fork in the yaw rate sensor 130 may electronically detect the yaw rate of the vehicle 1 while generating oscillatory change. According to an embodiment, a selenium crystal element may be provided in the yaw rate sensor 130, and when the vehicle 1 is moved and rotated, the selenium crystal element may be rotated itself and voltage may be generated. The yaw rate sensor 130 may detect the yaw rate of the vehicle 1 based on the generated voltage.

As illustrated in FIG. 3, the wheel controller 150 may be provided in the vehicle 1. The wheel controller 150 may control an operation of the wheel according to an operation command from a user. The wheel controller 150 may be implemented by a processor such as Electronic Control Unit (ECU). The wheel controller 150 may generate speed information based on wheel operation, and may transmit the information via in-vehicle network of the vehicle 1. The wheel controller 150 may be referred to as "wheel driving unit", but for convenience of description, it will be referred to herein as the wheel controller 150.

As illustrated in FIG. 3, the transmission controller 140 may be provided in the vehicle 1. The transmission controller 140 may control an operation of the transmission according to an operation command from a user. The transmission controller 140 may be implemented by a processor such as Electronic Control Unit (ECU). The transmission controller 140 may be referred to as a "transmission driving unit", but for convenience of description, it will be referred to herein as the transmission controller 140.

The transmission controller 140 may generate speed information based on transmission operation, and may share the generated speed information with devices in the vehicle 1 via in-vehicle network of the vehicle 1. Accordingly, as described later, the camera controller 112 may determine steering torque amount by using the speed information.

For example, as illustrated in FIG. 5, the vehicle 1 may need the speed information to estimate whether the vehicle 1 will move out of the control point (L) of the left lane or the control point of the right lane (R), and at which point. According to an embodiment, in a state in which the vehicle 1 drives at a certain angle, the vehicle 1 may more quickly move out of the control point when the speed of the vehicle 1 is fast. Accordingly, the camera controller 112 may estimate a distance to the control point of the left lane or the right lane by using the speed information so that it may better estimate when the lane keeping control operation should be performed. A detailed description of the camera controller 112 will be described later.

The camera module 110 may be provided in the vehicle 1. According to an embodiment, the camera module 110 may be disposed in the headlining 13 of the vehicle 1, as illustrated in FIG. 2, but is not limited thereto. The camera module 110 may be disposed in any position to allow front area of the vehicle 1 to be recorded.

Referring to FIG. 3, the camera 110 may include a recording unit 111, a camera controller 112, and a camera database 113. The recording unit 111 may acquire image information related to front of the vehicle 1. Herein, the front of the vehicle 1 may represent a direction viewed from the inside of the vehicle 1 toward a windshield 87. The image formation may include objects, such as trees around a road, a traffic sign, as well as guiderails, signs, adjacent vehicles, and in addition, may include a lane on a road in which the vehicle drives.

The camera controller 112 may control entire operation of the camera module 110. The camera controller 112 may be implemented by a processing unit configured to perform various calculation and control processes, such as a processor embedded in the camera module 110, but is not limited thereto. The camera controller 112 may be implemented by well-known technology.

For example, the camera controller 112 may generate a control signal, and may control the recording unit 111 by the generated control signal. In addition, the camera controller 112 may call needed information from the camera data base 113 by using the control signal, and may store a variety of information.

The camera controller 112 may derive a variety of information from the image information by image processing.

For example, the camera controller 112 may derive a variety of information, such as information needed to recognize a road, and information needed to recognize vehicle condition. Herein, image processing methods may be implemented by weft-known technology.

The information needed to recognize the road may include a lane, a lane width of the road in which the vehicle drives, and a curvature of the road, but is not limited thereto. The information needed to recognize the vehicle condition may include a steering wheel angle of the vehicle 1 and a vehicle width of the vehicle 1, but is not limited thereto.

The camera controller 112 may predict whether to move out of a control point, which is set by a user, by combining a variety of information derived from the image information with a variety of information transmitted from the devices in the vehicle 1, and may determine whether to perform the lane keeping process based on a result of the prediction.

For example, the camera controller 112 may receive information from the yaw rate sensor 130, the transmission sensor 140, and the wheel controller 150 via the CAN. Accordingly, the camera controller 112 may determine whether to perform the lane keeping control operation by combining the above-mentioned information with a control point input from a user. That is, the camera controller 112 may recognize road conditions and the vehicle condition from the above-mentioned information, and when it is predicted to move out of the control point, which is set by a user, based on a result of the recognition, the lane keeping control operation may be performed. Therefore, the camera controller 112 may predict whether to move out of the control point at a certain point of time to allow the vehicle 1 to return to a safe route more quickly.

As illustrated in FIG. 3, the camera controller 112 may receive yaw rate information from the yaw rate sensor 130, and speed information from at least one of the transmission controller 140 and the wheel controller 150 via the controller 170. The camera controller 112 may receive information from the above-mentioned components directly, but is not limited to those components illustrated in the drawings.

When the lane keeping control operation is determined to be performed, the camera controller 112 may determine a torque amount to be applied to a steering wheel, and a direction in which a torque is applied, based on a control degree input from a user. Herein, for description of convenience, the torque may be referred to as "steering torque".

When it is predicted that the lane keeping control should be performed because the vehicle 1 moves out of a lane, the camera controller 112 may determine a steering torque value applied to the steering wheel and a direction of application so that the vehicle 1 returns to the center area of the lane. For example, when the vehicle 1 moves out of the control point of the left lane, the camera controller 112 may determine a torque direction to allow a steering torque to be applied to be ahead to clockwise, that is the right direction of the vehicle 1.

The camera controller 112 may determine a steering torque amount to be directly proportional to an input control degree. For example, when a user sets a control degree to be high, the camera controller 112 may determine a steering torque value applied to the steering wheel to be high. Accordingly, according to an embodiment, the vehicle 1 may be returned to the center area of the lane more quickly.

For another example, when a user sets a control degree to be low, the camera controller 112 may determine a steering torque value applied to the steering wheel to be low. Accordingly, according to an embodiment, the vehicle 1 may be returned to the center area of the lane more slowly.

Therefore, a period of time and a distance, both of which are taken to return to the center area of the lane, will be determined based on the control degree.

According to an embodiment, the camera controller 112 may receive speed information of the vehicle 1 from at least one of the transmission sensor 140 and the wheel controller 150 via the CAN. Accordingly, the camera controller 112 may predict whether to move out of the control point input from a user, based on road information and vehicle information, and when it is predicted to move out of the control point, the camera controller 112 may determine a steering torque value and a direction applied to a steering wheel. The road information may represent information, which is derived from the image information and needed to recognize to road conditions, as mentioned above. The vehicle information may include information needed to recognize the above-mentioned vehicle conditions, speed information, and yaw rate information transmitted via the in-vehicle network.

According to an embodiment, the camera controller 112 may recognize a driving direction of the vehicle 1 by using yaw rate information and steering angle information. When it is predicted to move out of the control point, which is set by a user based on the result of the prediction of the driving direction, the camera controller 112 may predict a point of time, which is predicted to move out of the control point, by using the speed information.

The camera controller 112 may determine a torque direction and a torque value applied to the steering wheel by combining a control degree, which is input from a user, with road information and vehicle information, such as speed information, a lane width, a vehicle width, yaw rate information and steering angle information. Accordingly, the controller 170 may apply the steering torque to the steering wheel by controlling the operation of the steering system 160 through the control signal, as illustrated in later.

In the camera database 113, the image information and a variety of data derived from the image information may be stored. In addition, in the camera database 113, programs and algorism related to a process method configured to derive a variety of information from the image information may be stored, but is not limited thereto.

The camera database 113 may be implemented by at least one of flash memory type, hard disk type, multimedia card micro type, card type memory, e.g. SD or XD memory, Random Access Memory (RAM), Static Random Access Memory (SRAM), Read-Only Memory (ROM), (Electrically Erasable Programmable Read-Only Memory (EEPROM), (Programmable Read-Only Memory (PROM), magnetic memory, magnetic disk, and optical disk, but is not limited thereto. The camera database 113 may be implemented by any well-known type in the art.

As illustrated in FIG. 3, a controller 170 may be provided in the vehicle 1. The controller 170 may be implemented by a processor, such as a Micro Control Unit (MCU) and an ECU. The controller 170 may be embedded in the AVN terminal 100, but is not limited thereto.

The controller 170 may control an overall operation of the vehicle 1. Particularly, the controller 170 may control operation of all components of the vehicle 1 such as the display unit 101, the camera module 110, and the input unit 120, as well as a variety of modules embedded in the vehicle 1. The controller 170 may generate a control signal configured to control the component of the vehicle 1 to control an operation of the above-mentioned each component.

For example, the controller 170 may control an operation of the air conditioning device via the control signal, and may display a variety of information by controlling the operation of the display unit 101, but is not limited thereto. In addition, the controller 170 may control a variety of display devices via a control signal or may provide a variety of information to a user by controlling the speaker 143.

The controller 170 may operate the steering wheel by controlling an operation of the steering system 160 based on a result of the process by the camera controller 122. The steering system 160 may represent a device configured to control the operation of the steering wheel by applying a torque to the steering wheel.

The steering system 160 may include Electronic Power Steering (EPS) and a hydraulic steering system. According to an embodiment, the steering system 160 may include Motor-Driven Power Steering (MDPS), and Electronic Power Steering (EPS), but is not limited thereto.

Referring to FIG. 4, a controller 180 may be provided in the vehicle 1. The controller 180 may be implemented by a processing unit configured to perform various calculation and control processes, such as a processor embedded in the camera module 110, but is not limited thereto. The camera controller 112 may be implemented by well-known technology. An operation by the controller 180 may include the camera controller 112 and the controller 170, as illustrated in FIG. 3, and thus a detail description will be omitted.

According to an embodiment, the camera controller 112 and the controller 170 may be integrated in system on chip embedded in the AVN terminal 100. That is, the controller 170 may be embedded in the AVN terminal 100, and may perform the operation of the above-mentioned components integrally.

Hereinafter, a flow of operation of the vehicle will be simply described.

Figure 10:
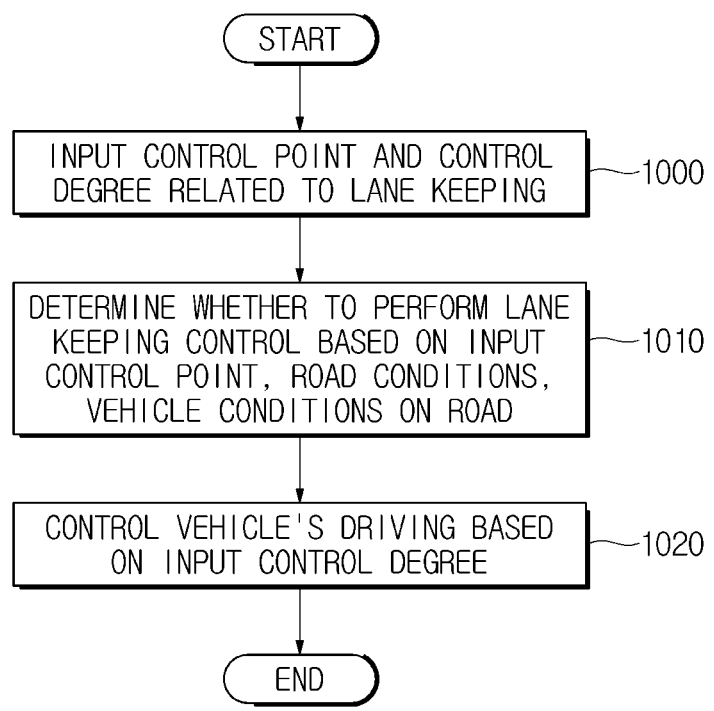
FIG. 10 is a control flow chart illustrating an operation of a vehicle performing a lane keeping control operation in accordance with an embodiment of the present disclosure.

FIG. 10 is a control flow chart illustrating an operation of a vehicle performing a lane keeping control operation in accordance with an embodiment of the present disclosure, and FIG. 11 is a view illustrating a case of controlling a vehicle based on a distance between a left side lane and a right side lane based on a control point input from a user in accordance with an embodiment of the present disclosure.

A vehicle may receive an input of a variety of control command related to operation of a vehicle, a variety of devices embedded in the vehicle, systems, or modules, from a user via an input unit. For example, the vehicle may receive an input of a variety of setting command related to the lane keeping control operation, from a user.

According to an embodiment, the vehicle may receive an input of a control point and a control degree related to the lane keeping from a user via the input unit (1000). At this time, the lane keeping control operation may be independently performed in the left side and the right side. Therefore, the vehicle may receive individually an input of a control point related to the left side and the right side. That is, the vehicle may receive the control point of the left lane width and the control point of the right lane width, individually, and then may perform a lane keeping control operation of the left side and a lane keeping control operation of the right side, individually.

The vehicle may determine whether to control the vehicle based on the control point, which is input from a user, driving road conditions and the vehicle condition (1010). The road condition may be recognized from the road information. The road information may be derived from the image information by image processing. According to an embodiment, the road information may include a lane width, and a lane curvature, but is not limited thereto. The road information may include any kind of information, which is needed for the lane keeping control operation and as long as being derived through the image processing. The image processing may be performed through as-well known technology, but is not limited thereto.

The vehicle information may represent information needed to recognize the vehicle conditions and may include information derived via the in-vehicle network as well as derived by the image processing. For example, the vehicle information may include a vehicle width, a steering angle, speed information and yaw rate information, but is not limited thereto. The vehicle information may include any kind information needed to recognize vehicle conditions.

The vehicle may predict whether the vehicle moves out of a control point, which is input from a user, based on the road information and the vehicle information, and when it is predicted that the vehicle moves out of the control point, the vehicle may determine a steering torque value and a direction applied to a steering wheel in order that the vehicle returns to the center area of the lane or returns to around the center area of the lane.

Figure 11A:
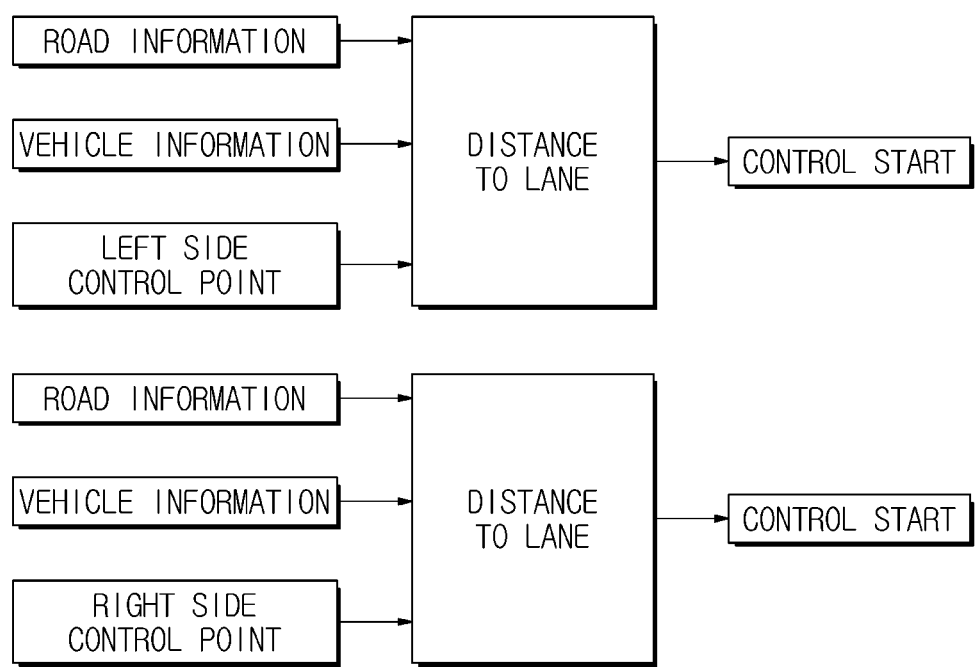
FIG. 11A is a first view illustrating a case of controlling a vehicle based on a distance between a left side lane and a right side lane based on a control point input from a user in accordance with an embodiment of the present disclosure.

For example, referring to FIG. 11A, the vehicle may estimate a distance to a lane by combining the road information, the vehicle information and the control point. The distance to the lane may represent a distance to a left line boundary or a distance to a right line boundary. That is, the vehicle may predict whether to move out of the control point by combining the above-mentioned information. Accordingly, when it is predicted to move out, the vehicle may start the control of the vehicle, as illustrated in FIG. 11A.

The vehicle may determine a steering torque value based on a control degree input via the input unit. The control degree may represent an intensity of intervention with the driver's driving through the lane keeping control operation. As the control degree is increased, the intensity of intervention with the driver's driving may be increased. Accordingly, a period of time and a distance, both of which are required to return to the center area of the lane, may be reduced. However, there may be disadvantages regarding reducing the driver's steering control when the control degree is increased. Therefore, the vehicle allows a user to set a control degree, such that the vehicle may operate the steering wheel according to the control degree. The vehicle may apply a steering torque value in a direction, which allows the vehicle to return to the center area of the lane by controlling the operation of the steering system.

Figure 11B:
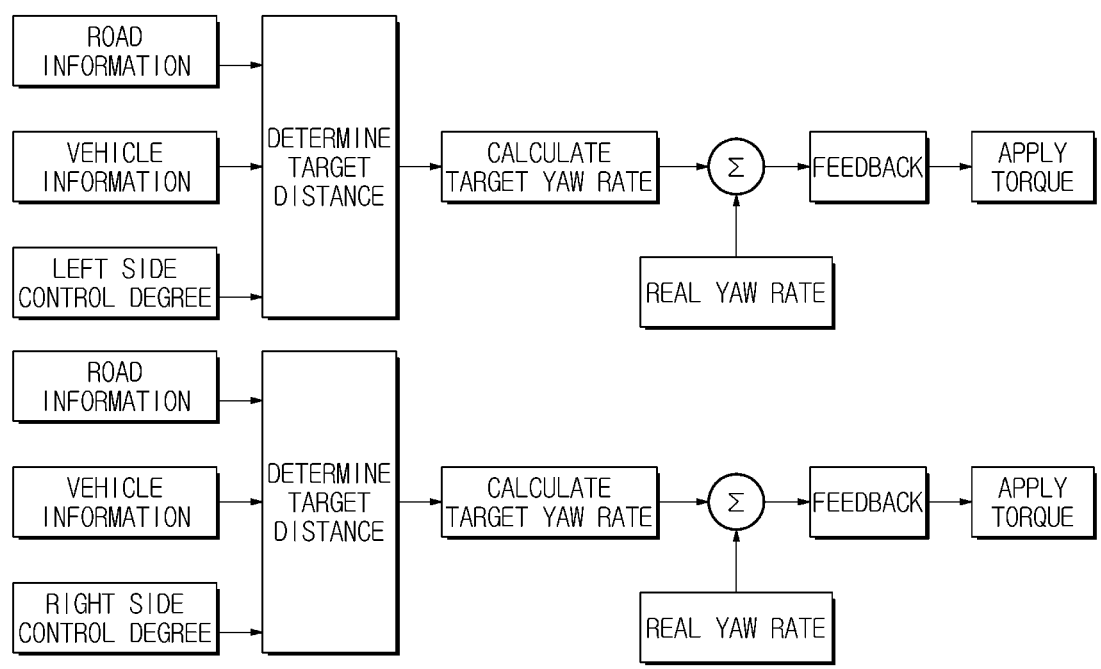
FIG. 11B is a second view illustrating a case of controlling a vehicle based on a distance between a left side lane and a right side lane based on a control point input from a user in accordance with an embodiment of the present disclosure.

For example, referring to FIG. 11B, the vehicle may determine a target distance based on the road information, the vehicle information, and the input control degree. The target distance may represent a distance, which is required for the vehicle to return to the center area of the lane or around the center area of the lane. As an example, as the control degree is increased, the target distance may be determined to be short.

The vehicle may calculate a target yaw rate based on the target distance, and may calculate a steering torque value to be applied, by comparing the target yaw rate with a real yaw rate through the driver's operation. Accordingly, the vehicle may control the vehicle itself so that the vehicle enters the control point by applying a torque to the steering wheel based on the steering wheel torque value by controlling the steering system.

According to embodiments, the vehicle may receive an input of a control point and a control degree from a user in order to support a Lane Keeping Assist System (LKAS), in which a driving habit and driving style are applied for each driver, and may perform the lane keeping control operation based on those inputs. Accordingly, the vehicle may prevent a user who feels discomfort with the LKAS from turning it off. Therefore, the user's safety may be secured and the freedom of the user's driving may be increased.

The method according to an embodiment may be implemented as a program instruction form configured to be operable by various computer means recorded in a computer readable medium. The computer-readable medium may include alone or in combination with the program instructions, data files, data structures. The program command that is recorded in the medium may be specially configured or designed for the embodiment, or available, which is well known in the computer software skilled in the art. Examples of the computer readable recording medium may include magnetic media, e.g. hard disk, floppy disk, and magnetic tape, optical media, e.g. CD-ROM and DVD, magneto-optical media, e.g. floptical disk, and hardware device configured to perform and store program instruction, e.g. ROM, RAM, and flash memory.

The program instructions may include high level language code operable by a computer by using an interpreter as well as machine language code generated by a compiler. The hardware device may be configured to be operable as one or more software modules to perform the operation of the embodiment, and vice versa.

Although various embodiments of the present disclosure have been shown and described, it would be appreciated by those skilled in the art that changes may be made in these embodiments without departing from the principles and spirit of the disclosure, the scope of which is defined in the appended claims and their equivalents.

What is claimed is:

1. A vehicle comprising:
   an input unit configured to receive an input of a control point and a control degree related to lane keeping;
   a lane controller configured to determine whether to perform a lane keeping control based on the input control point, road conditions and vehicle conditions in the road; and
   a controller configured to control the vehicle's driving based on the control degree when the lane controller determines to perform the lane keeping control,
   wherein the lane controller derives road condition information used to recognize the road conditions and vehicle condition information used to recognize the vehicle conditions.

2. The vehicle of claim 1, wherein
   the input unit receives an input of a control point for a left lane and a control degree for a left lane, and a control point for a left lane and a control degree for a right lane, individually.

3. The vehicle of claim 1, wherein
   the input unit receives an input of a lane keeping level, which relates the control point and the control degree.

4. The vehicle of claim 1, wherein
   the controller displays a user interface configured to receive an input of at least one of the control point, the control degree, and a lane keeping level of the vehicle in a display unit.

5. The vehicle of claim 1, wherein
   the controller displays a user interface configured to receive input of at least one of the control point, the control degree, and a lane keeping level, where the lane keeping level is within a pre-set range.

6. The vehicle of claim 1, further comprising:
   a recording unit configured to acquire image information related to a front area of the vehicle.

7. The vehicle of claim 6, wherein
the lane controller derives the road condition information and the vehicle condition information from the image information acquired by the recording unit by image processing.

8. The vehicle of claim 7, wherein
the lane controller determines whether to perform the lane keeping control based on the road condition information, the vehicle condition information, and the input control point.

9. The vehicle of claim 1, wherein
the lane controller determines a steering torque value to be applied to a steering wheel based on the input control degree.

10. The vehicle of claim 9, wherein
the lane controller applies a torque to the steering wheel based on the steering torque value.

11. The vehicle of claim 2, wherein
the lane controller independently determines whether to perform the lane keeping control for the left lane and the right lane based on the input control points for the left lane and the right lane, respectively, and independently determines steering torques for the left lane and the right lane based on the input control degrees for the left lane and the right lane, respectively.

12. A control method of a vehicle comprising steps of:
receiving an input of a control point and a control degree related to lane keeping;
determining whether to perform a lane keeping control based on the input control point, road conditions and vehicle conditions in the road; and
controlling the vehicle's driving based on the control degree when the lane keeping control is determined to be performed,
wherein the determining further comprises deriving road condition information used to recognize road the conditions and vehicle condition information used to recognize the vehicle conditions.

13. The control method of claim 12 wherein
the step of receiving an input includes receiving an input of a control point for a left lane, a control degree for a left lane, a control point for a right lane and a control degree for a right lane, individually.

14. The control method of claim 12 wherein
the step of receiving an input includes receiving a lane keeping level which relates the control point and the control degree.

15. The control method of claim 12 wherein
the step of receiving an input comprises acquiring image information related to a front area of the vehicle.

16. The control method of claim 15 wherein
the step of determining further comprises deriving the road condition information and the vehicle condition information from the acquired image information by image processing.

17. The control method of claim 16 wherein
the step of determining further comprises determining whether to perform the lane keeping control based on the road condition information, the vehicle condition information, and the input control point.

18. The control method of claim 12 wherein
the step of determining includes determining a steering torque value applied to a steering wheel based on the input control degree.

19. The control method of claim 12 wherein
the step of controlling includes applying a torque to the steering wheel based on the steering torque value.

20. The control method of claim 13 wherein
the step of determining further comprises determining whether to perform the lane keeping control for the left lane and the right lane based on the control points of the left lane and the right lane, respectively, and determining steering torques for the left lane and the right lane based on the input control degrees of the left lane and the right lane, respectively.

* * * * *